(12) United States Patent
Hekman et al.

(10) Patent No.: US 7,578,051 B2
(45) Date of Patent: Aug. 25, 2009

(54) MACHINE FOR PRESS FIT ASSEMBLY

(75) Inventors: Edward W. Hekman, Alto, MI (US);
John E. Swistak, Grandville, MI (US);
David J. Ruthven, Wyoming, MI (US);
David P. Deyoung, Zeeland, MI (US)

(73) Assignee: Autocam Corporation, Kentwood, MI (US)

( * ) Notice: Subject to any disclaimer, the term of this patent is extended or adjusted under 35 U.S.C. 154(b) by 464 days.

(21) Appl. No.: 11/300,926

(22) Filed: Dec. 15, 2005

(65) Prior Publication Data

US 2006/0137546 A1     Jun. 29, 2006

Related U.S. Application Data

(60) Provisional application No. 60/639,453, filed on Dec. 28, 2004.

(51) Int. Cl.
*B23P 21/00* (2006.01)
(52) U.S. Cl. .............................. 29/709; 29/712; 29/714; 29/718; 29/407.09; 29/407.1
(58) Field of Classification Search .............. 29/407.05, 29/407.09, 407.1, 468, 525, 705, 709, 712, 29/714, 718, 281.1, 281.4
See application file for complete search history.

(56) References Cited

U.S. PATENT DOCUMENTS

| | | | | |
|---|---|---|---|---|
| 5,619,782 A | * | 4/1997 | Tanaka et al. | 29/407.1 |
| 5,722,147 A | * | 3/1998 | Brazle | 29/464 |
| 6,490,775 B1 | * | 12/2002 | Juranitch et al. | 29/407.05 |
| 6,754,948 B2 | * | 6/2004 | Juranitch et al. | 29/705 |
| 2002/0007544 A1 | * | 1/2002 | Harada et al. | 29/407.1 |

FOREIGN PATENT DOCUMENTS

JP     03145953 A   *   6/1991

* cited by examiner

*Primary Examiner*—Jermie E Cozart
(74) *Attorney, Agent, or Firm*—Price, Heneveld, Cooper, DeWitt & Litton, LLP

(57) ABSTRACT

A press machine for press fit assembly of a torsion bar to a pinion gear of a power steering system includes a controller and a support structure. A first holder supports a pinion gear, and a second holder supports a torsion bar of a spool-valve assembly of a power steering system. The press machine also includes a sensor adapted to determine a position of a torsion bar in the second holder relative to a pinion gear in the first holder. At least one powered actuator is connected to the support structure and the first or second holders. The powered actuator provides controlled translational and rotational motion to press fit a pinion gear to a torsion bar. The controller causes the powered actuator to rotate one of the holders relative to the other of the holders based, at least in part, upon the position of the torsion bar relative to the pinion gear to thereby provide proper alignment of the torsion bar and pinion gear upon completion of the press fit operation.

18 Claims, 19 Drawing Sheets

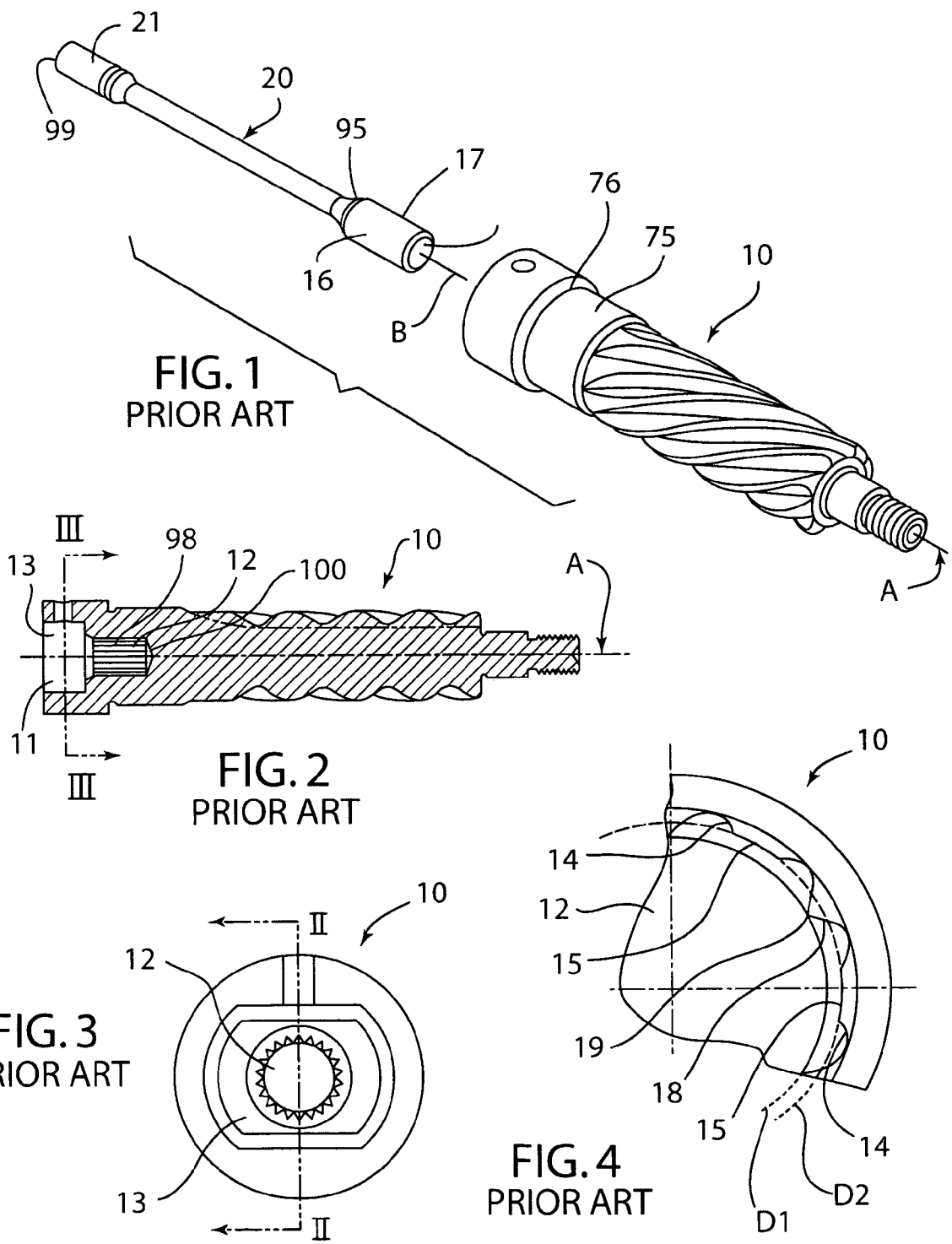

| ROTATION ANGLE | (REAR) CHART 0 | (RIGHT) CHART 1 | (LEFT) CHART 2 | ROTATION ANGLE | (REAR) CHART 0 | (RIGHT) CHART 1 | (LEFT) CHART 2 |
|---|---|---|---|---|---|---|---|
| 0 | 0.8 | -0.4 | -0.4 | 185 | -0.796 | 0.338 | 0.458 |
| 5 | 0.796 | -0.338 | -0.458 | 190 | -0.786 | 0.274 | 0.514 |
| 10 | 0.788 | -0.272 | -0.514 | 195 | -0.772 | 0.280 | 0.566 |
| 15 | 0.722 | -0.206 | -0.564 | 200 | -0.75 | 0.14 | 0.612 |
| 20 | 0.752 | -0.138 | -0.612 | 205 | -0.724 | 0.07 | 0.656 |
| 25 | 0.724 | -0.07 | -0.54 | 210 | -0692 | 0 | 0.692 |
| 30 | 0.692 | 0 | -0.692 | 215 | -0.654 | -0.07 | 0.724 |
| 35 | 0.656 | 0.07 | -0.724 | 220 | -0.612 | -0.138 | 0.752 |
| 40 | 0.612 | 0.14 | -0.75 | 225 | -0.564 | -0.206 | 0.772 |
| 45 | 0.566 | 0.208 | -0.772 | 230 | -0.514 | -0.272 | 0.788 |
| 50 | 0.514 | 0.274 | -0.786 | 235 | -0.458 | -0.338 | 0.796 |
| 55 | 0.458 | 0.338 | -0.796 | 240 | -0.4 | -0.4 | 0.8 |
| 60 | 0.4 | 0.4 | -0.798 | 245 | -0.338 | -4.58 | 0.796 |
| 65 | 0.338 | 0.458 | -0.796 | 250 | -0.272 | -0.514 | 0.788 |
| 70 | 0.274 | 0.514 | -0.786 | 255 | -0.206 | -0.564 | 0.772 |
| 75 | 0.280 | 0.566 | -0.772 | 260 | -0.138 | -0.612 | 0.752 |
| 80 | 0.14 | 0.612 | -0.75 | 265 | -0.07 | -0654 | 0.724 |
| 85 | 0.07 | 0.656 | -0.724 | 270 | 0 | -0.692 | 0.692 |
| 90 | 0 | 0.692 | -0.692 | 275 | 0.07 | -0.724 | 0.656 |
| 95 | -0.07 | 0.724 | -0.654 | 280 | 0.14 | -0.75 | 0.612 |
| 100 | -0.138 | 0.752 | -0.612 | 285 | 0.208 | -0.772 | 0.566 |
| 105 | -0.206 | 0.772 | -0.564 | 290 | 0.274 | -0.786 | 0.514 |
| 110 | -0.272 | 0.788 | -0.514 | 295 | 0.338 | -0.796 | 0.458 |
| 115 | -0.338 | 0.796 | -0.458 | 300 | 0.4 | -0.798 | 0.4 |
| 120 | -0.4 | 0.8 | -0.4 | 305 | 0.458 | -0.796 | 0.338 |
| 125 | -4.58 | 0.796 | -0.338 | 310 | 0.514 | -0.786 | 0.274 |
| 130 | -0.514 | 0.788 | -0.272 | 315 | 0.566 | -0.772 | 0.208 |
| 135 | -0.564 | 0.772 | -0.206 | 320 | 0.612 | -0.75 | 0.14 |
| 140 | -0.612 | 0.752 | -0.138 | 325 | 0.656 | -0.724 | 0.07 |
| 145 | -0.654 | 0.725 | -0.07 | 330 | 0.692 | -0.692 | 0 |
| 150 | -0.692 | 0.692 | 0 | 335 | 0.724 | -0.654 | -0.07 |
| 155 | -0.724 | 0.656 | 0.07 | 340 | 0.752 | -0.612 | -0.138 |
| 160 | -0.75 | 0.612 | 0.14 | 345 | 0.772 | -0.564 | -0.206 |
| 165 | -0.772 | 0.566 | 0.208 | 350 | 0.788 | -0.514 | -0.272 |
| 170 | -0.786 | 0.514 | 0.274 | 355 | 0.796 | -0.458 | -0.338 |
| 175 | -0.796 | 0.458 | 0.338 | 360 | 0.8 | -0.4 | -0.4 |
| 180 | -0.798 | 0.4 | 0.4 | | | | |

FIG. 16A

| DATA SCREEN | | | CURRENT WK PART | | | | AUTO | MANUAL |
|---|---|---|---|---|---|---|---|---|

POSITION

CURRENT DATA

| SEQ. | LEFT | REAR | RIGHT | FORCE | ANGLE | DISP. | DEPTH | PRES. TRIP | YEAR | MONTH | DAY | HOUR | MIN | READ o |
|---|---|---|---|---|---|---|---|---|---|---|---|---|---|---|
| 175 | 0.139 | 0.766 | 0.244 | 865 | 44 | 0.045 | 1.526 | 0 | XXXX | X | XX | XX | XX | |

HISTORY

| | POSITION | | | | | | | PRES. | DATE | | | |
|---|---|---|---|---|---|---|---|---|---|---|---|---|
| SEQ. | LEFT | REAR | RIGHT | FORCE | ANGLE | DISP. | DEPTH | TRIP | YEAR | MONTH | DAY | HOUR |
| 170 | 0.213 | 0.620 | 0.397 | 696 | 205 | 0.027 | 1.498 | 0 | XXXX | XX | XX | XX |
| 171 | 0.415 | 0.413 | 0.413 | 1329 | 196 | 0.277 | 1.367 | 0 | XXXX | X | XX | XX |
| 171 | 0.646 | 0.246 | 0.406 | 631 | 243 | 0.050 | 1.525 | 0 | XXXX | X | XX | XX |
| 172 | 0.419 | 0.418 | 0.417 | 1500 | 24 | 0.245 | 1.346 | 0 | XXXX | X | XX | XX |
| 172 | 0.120 | 0.732 | 0.241 | 643 | 317 | 0.018 | 1.505 | 0 | XXXX | X | XX | XX |
| 173 | 0.426 | 0.423 | 0.423 | 1311 | 66 | 0.579 | 1.372 | 0 | XXXX | X | XX | XX |
| 173 | 0.610 | 0.661 | 0.794 | 696 | 66 | 0.209 | 1.531 | 0 | XXXX | X | XX | XX |
| 174 | 0.436 | 0.434 | 0.434 | 1623 | 45 | 0.142 | 1.299 | 0 | XXXX | X | XX | XX |
| 175 | 0.465 | 0.433 | 0.433 | 1336 | 22 | 0.271 | 1.369 | 0 | XXXX | X | XX | XX |
| 175 | 0.139 | 0.766 | 0.244 | 865 | 44 | 0.045 | 1.526 | 0 | XXXX | X | XX | XX |

▷ ◁

RETURN TO MAIN

FIG. 20

| CORRECTION SCREEN | CURRENT PART | WK | AUTO | MANUAL |
|---|---|---|---|---|
| | | | | CORRECTION FACTOR |
| DISPLACEMENT | | PRESSURE AT DISPLACEMENT | | |
| .25 | 1500.00 | DISP. #1 | ADDER | 0.250 |
| .50 | 2200.000 | DISP. #2 | MULTIPLIER | 1.400 |
| PRESS FORCE MEAN | 1600.000 | | PRESSURE MOVE 1 | 0.150 |
| PRESS IN FORCE MULITPLIER | 2.000 | | PRESSURE MOVE 2 | 0.150 |
| | | | INITIAL TOLERANCE | 1.000 |
| DEPTH MULTIPLIER | 1.600 | | PART TOLERANCE | 0.200 |
| | | | RETRY #1 | 1 |
| LEFT SERVO START | -2.240 | | REAR SERVO START | 0.200 |
| RIGHT SERVO START | 1.080 | | CAMERA VIEW POS. | 2.000 |
| | | | | RETURN TO MAIN |

FIG. 24

MACHINE FOR PRESS FIT ASSEMBLY

CROSS-REFERENCE TO RELATED APPLICATION

This application claims the benefit of U.S. Provisional Application No. 60/639,453, filed Dec. 28, 2004, which is hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Tradmark Office patent file or records, but otherwise reserves all copyright rights whatsoever.

COMPUTER PROGRAM LISTING APPENDIX

A computer program listing appendix on one compact disc (labeled "Copy 1") includes a file titled RSLogix 5000 Report (2) 12.02.04, created on Dec. 2, 2004, 473.022 bytes and an identical copy (labeled "Copy 2") of the compact disc (labeled "Copy 1") are attached hereto.

All of the information on the above-identified compact discs is hereby incorporated by reference.

BACKGROUND OF THE INVENTION

Hydraulic power steering systems for vehicles typically include a rotary valve having a torsion bar. The torsion bar is a thin rod of metal that twists when torque is applied to it. One end of the bar is connected to the steering wheel, and the other end of the bar is connected to a pinion or worm gear, so the amount of torque in the torsion bar is equal to the amount of torque the driver is using to turn the wheels. The more torque the driver uses to turn the wheels, the more the bar twists. The input from the steering shaft forms the inner part of a spool-valve assembly. As the torsion bar twists, ports in the spool-valve open and close to provide high pressure hydraulic fluid to the appropriate hydraulic line to provide power assist.

In order to provide for proper operation of the rotary valve, the torsion bar and pinion gear must be precisely aligned. Providing the required degree of alignment between the torsion bar and pinion gear may be time consuming and problematic.

SUMMARY OF THE INVENTION

One aspect of the present invention is a press machine for press fit assembly of a second member, such as a torsion bar, into a first member, such as a pinion gear of a power steering system. The press machine includes a controller and a support structure. The press machine also includes a first holder configured to support the first member, and a second holder configured to support the second member. The press machine also includes a sensor adapted to determine a position of the second member in the second holder relative to a first member in the first holder. The press machine further includes at least one powered actuator connected to the support structure and operably coupled to a selected one of the first and second holders. The powered actuator provides translational and rotational motion to press fit the first member and second member together. The controller is programmed to cause the powered actuator to tilt the selected one of the first and second holders relative to the other of the first and second holders based, at least in part, upon a position of the first member relative to the second member to thereby provide proper alignment of the first member when it is press fit into the second member.

In another aspect of the present invention, the machine includes a sensor configured to determine a position of a second member relative to a first member, and at least three electrically powered actuators mounted to the support structure. Each actuator has a movable output member connected to the second holder providing translation and rotation of the second holder.

In yet another aspect of the present invention, the method includes pressing a first end of the first member into the cavity in a second member, and tilting the first and second members relative to one another to align the axis of the first member with the axis of the second member within a predetermined tolerance, prior to completion of pressing the first member into the cavity of the second member.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is an exploded perspective view of a power pinion gear and torsion bar;

FIG. 2 is a cross-sectional view of the pinion gear of FIG. 1;

FIG. 3 is a cross-sectional view of the pinion gear taken along the line III-III; FIG. 2;

FIG. 4 is a fragmentary, enlarged view of a portion of the cavity of the pinion gear;

FIG. 16A is a chart showing variables for determining the amount of displacement of the servos to compensate for misalignment of the torsion bar with the gear;

FIG. 20 shows the data screen;

FIG. 24 shows the correction screen.

DETAILED DESCRIPTION OF PREFERRED EMBODIMENT

Figure 5:
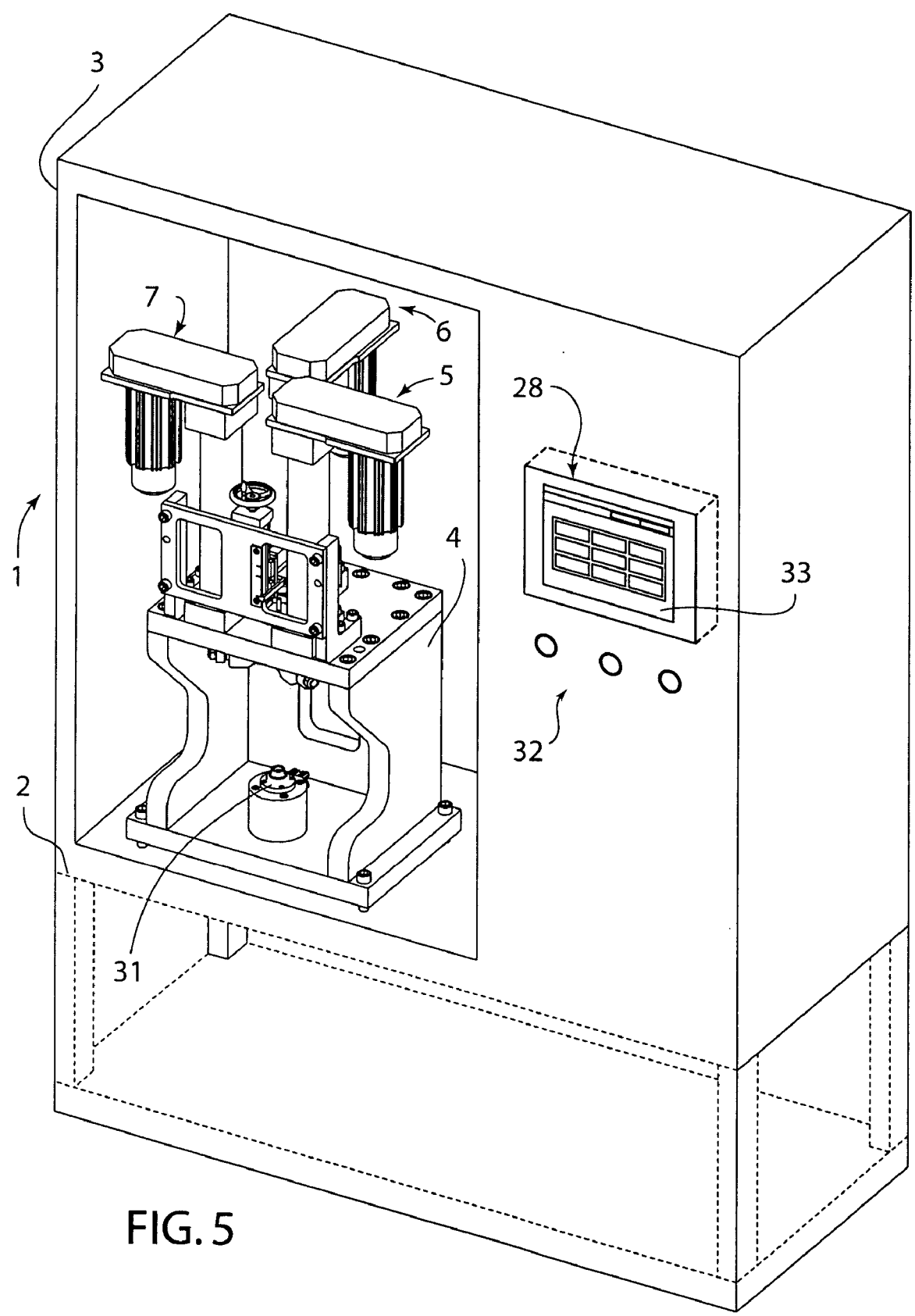
FIG. 5 is a perspective view of a machine for press fitting components according to one aspect of the present invention.
Figure 6:
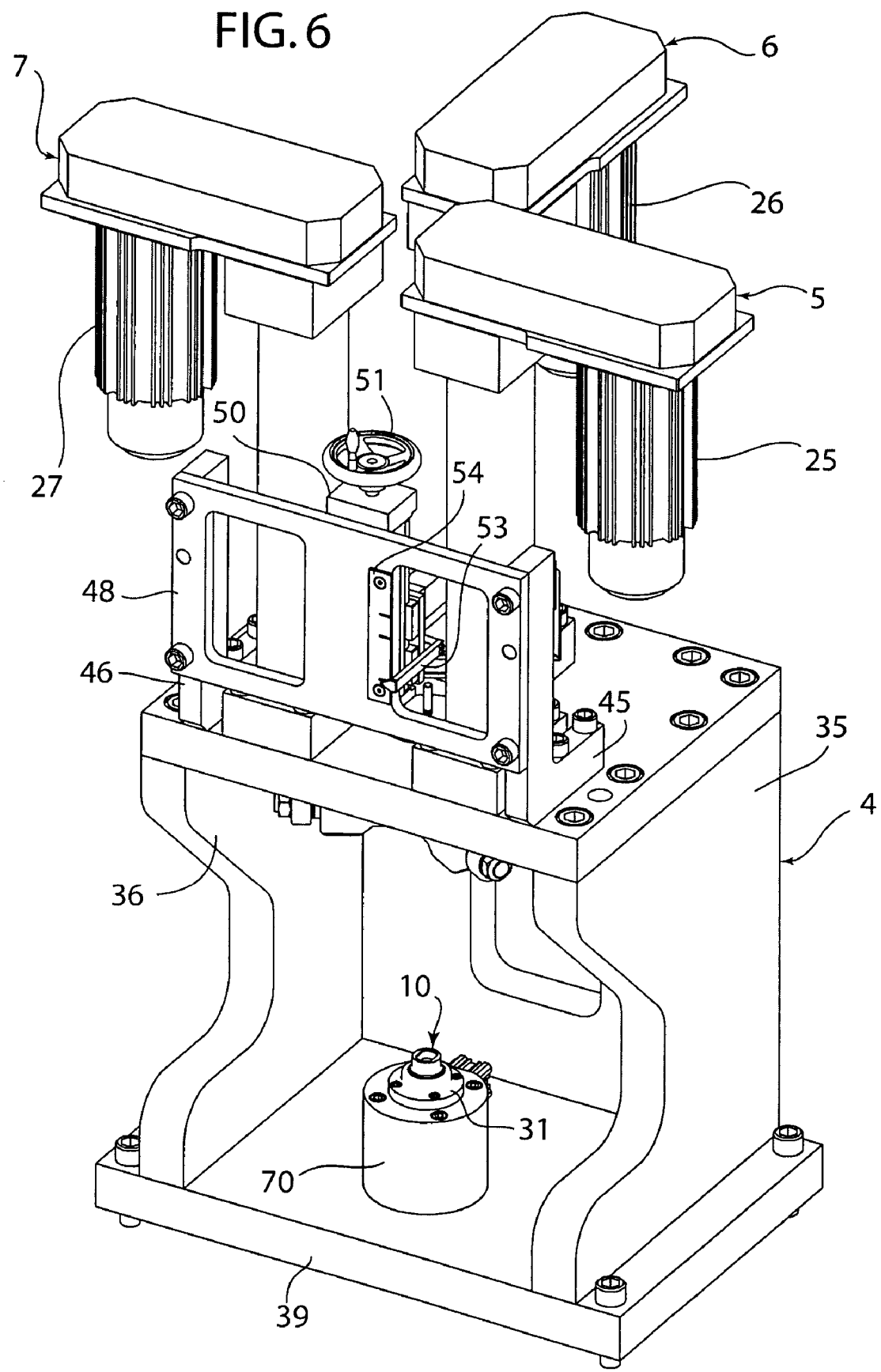
FIG. 6 is an enlarged perspective view of part of the machine of FIG. 5.
Figure 7:
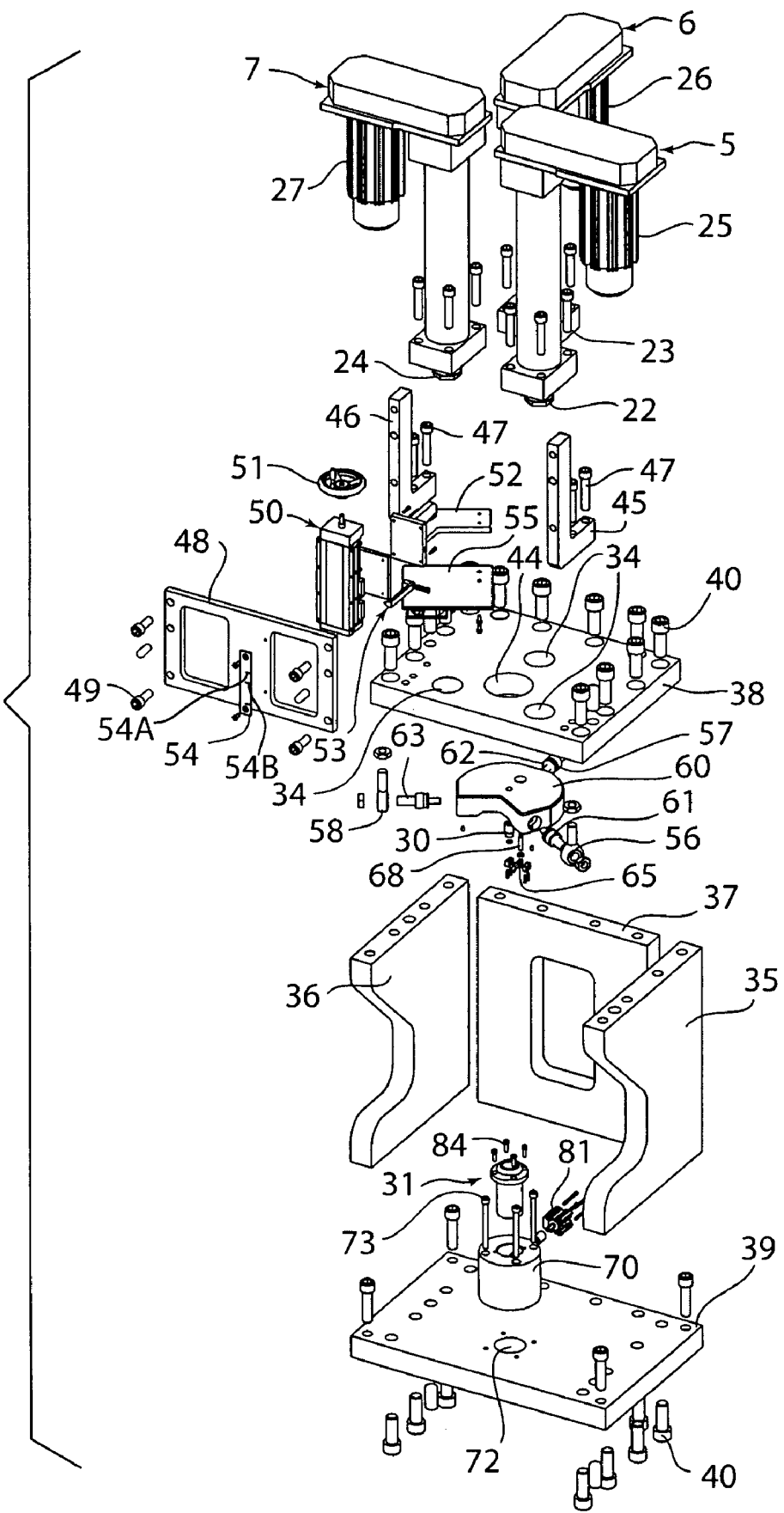
FIG. 7 is an exploded perspective view of the machine of FIG. 6.

For purposes of description herein, the terms "upper," "lower," "right," "left," "rear," "front," "vertical," "horizontal," and derivatives thereof shall relate to the invention as oriented in FIG. 5. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 8:
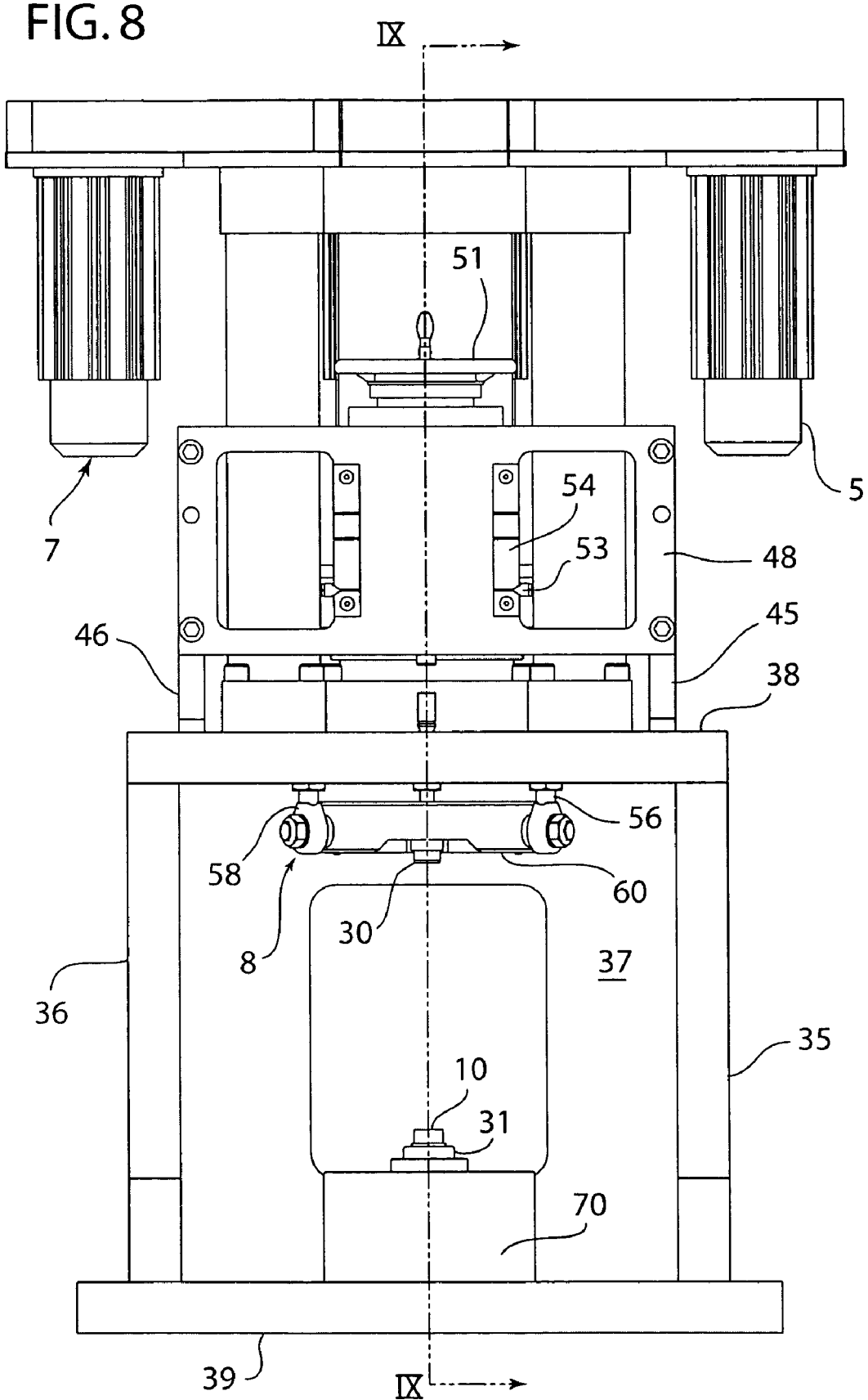
FIG. 8 is a front elevational view of the machine of FIG. 6.

A press machine/apparatus 1 (FIG. 5) according to the present invention is utilized to press a torsion bar 20 into a cavity 11 of a power steering pinion gear 10 (FIG. 1). As discussed in detail below, press machine 1 initially first executes an "initial press" and presses first end 17 of torsion bar 20 partway into cavity 11 of gear 10. Machine 1 then measures the alignment of the torsion bar 20 relative to the gear 10. If the axis "B" of torsion bar 20 and the axis "A" of gear 10 are not aligned within a required tolerance, the machine 1 executes a "correction move" and rotates/tilts torsion bar 20 by tilting head assembly 8 (see also FIGS. 8 and 9) relative to gear 10 in a direction opposite the misalignment, and the torsion bar 20 is then pressed further into cavity 11 in a second press to complete the press fit operation. Rotation/tilting of torsion bar 20 relative to gear 10 during the correction move brings the final alignment of the torsion bar 20 relative to gear 10 within tolerance.

Power steering pinion gear 10 (FIGS. 1-4) is formed by forging and includes a cavity 11 having a generally cylindrical inner portion 12 and an enlarged outer portion 13. The cylindrical inner portion 12 includes a plurality of raised portions 14, each having a cylindrical surface portion 15 configured to fit closely against an outer surface 16 (FIG. 1) at a first end 17 of a torsion bar 20. The outer surface 16 is machined to a high tolerance cylindrical shape. In addition to the raised portions 14, pinion gear 10 also includes a plurality of raised portions 18 forming ridges extending parallel to an axis "A" of pinion gear 10. Each of the ridges 18 includes a relatively sharp edge 19, and the raised portions 14 and ridges 18 are arranged in a alternating manner around the cylindrical portion 12 of gear 10. The edges 19 define an imaginary cylinder having a diameter D1 (FIG. 4) that is smaller than the diameter of the cylindrical outer surface 16 of torsion bar 20. The cylindrical surface portions 15 of raised portions 14 define an imaginary cylinder having a diameter D2 that is substantially the same as the diameter of the outer surface 16 of torsion bar 20.

During assembly, first end 17 of rod 20 is press fit into the cylindrical portion 12 of cavity 11. As the end 17 is press fit into the cavity 11, the ridges 18 deform the outer surface 16 of torsion bar 20, thereby providing a press fit. Also, the surfaces 15 of raised portions 14 fit tightly against the surface 16 of torsion bar 20 to thereby facilitate alignment of the axis A of gear 10 with axis B of torsion bar 20. Prior to the present invention, the axis A of pinion gear 10 was aligned with axis B of torsion bar 20 after completion of the press fit operation.

With further reference to FIGS. 5-9, a machine or press apparatus 1 according to the present invention includes a frame 2 and a housing 3, and a support structure 4 that supports servos such as electrically powered linear actuators 5, 6 and 7. Support structure 4 includes side members 35 and 36 and a rear member 37 that extend between and interconnects upper plate member 38 and lower plate member 39. A plurality of threaded fasteners 40 or the like interconnect the upper member 38, lower member 39, and side members 35, 36 and rear member 37.

The electrically powered servos/linear actuators 5-7 include elongated output rod members 22, 23, and 24 (FIG. 7), respectively that translate linearly upon actuation of electric motors 25, 26 and 27. Servos/linear actuators 5-7 include load cells (not shown) that are operably connected to controller 28 to enable controller 28 to determine the force required for the press fit operation. As described in more detail below, the output members 22-24 are operably connected to a head assembly 8 including a holder 30 that holds the torsion bar 20 to press fit torsion bar 20 into the gear 10. Lower holder 31 supports the gear 10 during the press fit operation. During the press fit operation, the linear actuators 5-7 are selectively actuated via a controller 28 (FIG. 5) to translate the output members 22-24. The holder 30 can be translated linearly, by actuating the linear actuators 5-7 at the same rate. Also, linear actuators 5, 6 and 7 can be selectively actuated to execute a correction move such that output rod members 22, 23 and 24 translate different distances to thereby tilt/angle holder 30. Holder 30 can thereby be selectively tilted/angled to align the axis B of torsion bar 20 with the axis A of gear 10 during a correction move prior to completion of the press fit operation.

A camera 55 (FIGS. 7, 9) is mounted to a bracket 52 and precisely measures the horizontal position of the upper end 21 of a torsion bar 20 in holder 30 when the torsion bar 20 is press fit into gear 10. A plurality of data points forming a tolerance circle 105 (FIG. 9A) are programmed into camera 55 (or controller 28). Camera 55 forms a circular image of the perimeter of end surface 99 of torsion bar 20. If the torsion bar 20 is aligned exactly with gear 10, an image 106 of the end of torsion bar 20 will be centered within tolerance circle 105, and a uniform ring 107 equal to the allowable tolerance for the part will be formed between tolerance circle 105 and image 106. If the end surface of torsion bar 20 falls outside the tolerance circle 105, an image 108 of the end of torsion bar 20 will be formed. Controller 28 compares the data points forming image 108 to the data forming tolerance circle 105. If some of the data points of circle 108 are outside the data points forming tolerance circle 107, controller 28 determines that the alignment is not within tolerance, and calculates the distance or displacement "D" from the center C1 of tolerance circle 105 and the center C2 of an image 108 (end of the torsion bar 20). The controller also calculates the angle α between axis Y and the direction of displacement (arrow "A") of the end of torsion bar 20. As discussed in more detail below, controller 28 utilizes the displacement D and angle α to calculate the required tilt angle correction of the torsion bar 20/head assembly 8 during a correction move. The vertical position of the camera 55 can be adjusted by turning a hand crank 51 of manually operable linear slide 50, such that the camera 55 can be positioned at the proper distance from end 21 of torsion bars 20 of different lengths. An opening 44 in upper member 38 provides clearance such that camera 55 is in optical communication with the end 21 of torsion bar 20.

The height of camera 55 can be adjusted to accommodate torsion bars 20 and gears 10 of varying lengths utilized for various steering systems. The camera height adjustment arrangement includes brackets 45 and 46 (FIG. 7) that are secured to upper member 38 by threaded fasteners 47. A fixed vertical plate member 48 is secured to the brackets 45 and 46 by threaded fasteners 49, and the base of linear slide 50 is secured to the plate member 48. Camera 55 mounts to a bracket 52 that is secured to the vertically movable portion of linear slide 50. Camera 55 and bracket 52 can be raised and lowered relative to the plate 48 by turning hand crank 51 of linear slide 50. An indicator 53 is secured to the bracket 52, and scale 54 is secured to the plate 48. The indicator 53 is positioned closely proximate scale 54, such that the height of camera 55 relative to the upper end 21 of torsion bar 20 can be determined via the position of the indicator 53 relative to scale 54. In use, an operator sets the height of the camera 55 to the proper height for a given torsion bar 20 and gear 10. After the initial set up for a particular torsion bar 20/gear 10 assembly, the required camera position(s) (e.g., 54A, 54B) can be marked on indicator 54 to thereby facilitate proper set up of machine 1.

The output members 22-24 of the linear actuators 5-7, respectively, are connected to ball joints 56, 57 and 58 (FIGS. 7 and 9), and the ball joints 56-58 are connected to a movable plate 60 via threaded connectors 61, 62 and 63, respectively. Linear actuators 5-7 are commercially available "Eliminator" model HD 404-12 units available from Axis Systems Corporation. Output members 22-24 of linear actuators 5-7 are movably mounted within housings 41, 42 and 43, respectively and extend through openings 34 in support member 38. Actuation of electric motors 25-27 causes output members 22-24 to extend and retract vertically from housings 41-43. The holder 30 for the torsion bar 20 is secured to the plate 60 and the ball joints 56-58 permit tilting of the plate 60 relative to its vertical axis to thereby tilt the torsion bar 20 during a correction move prior to completion of the press fit into gear 10.

Figure 9:
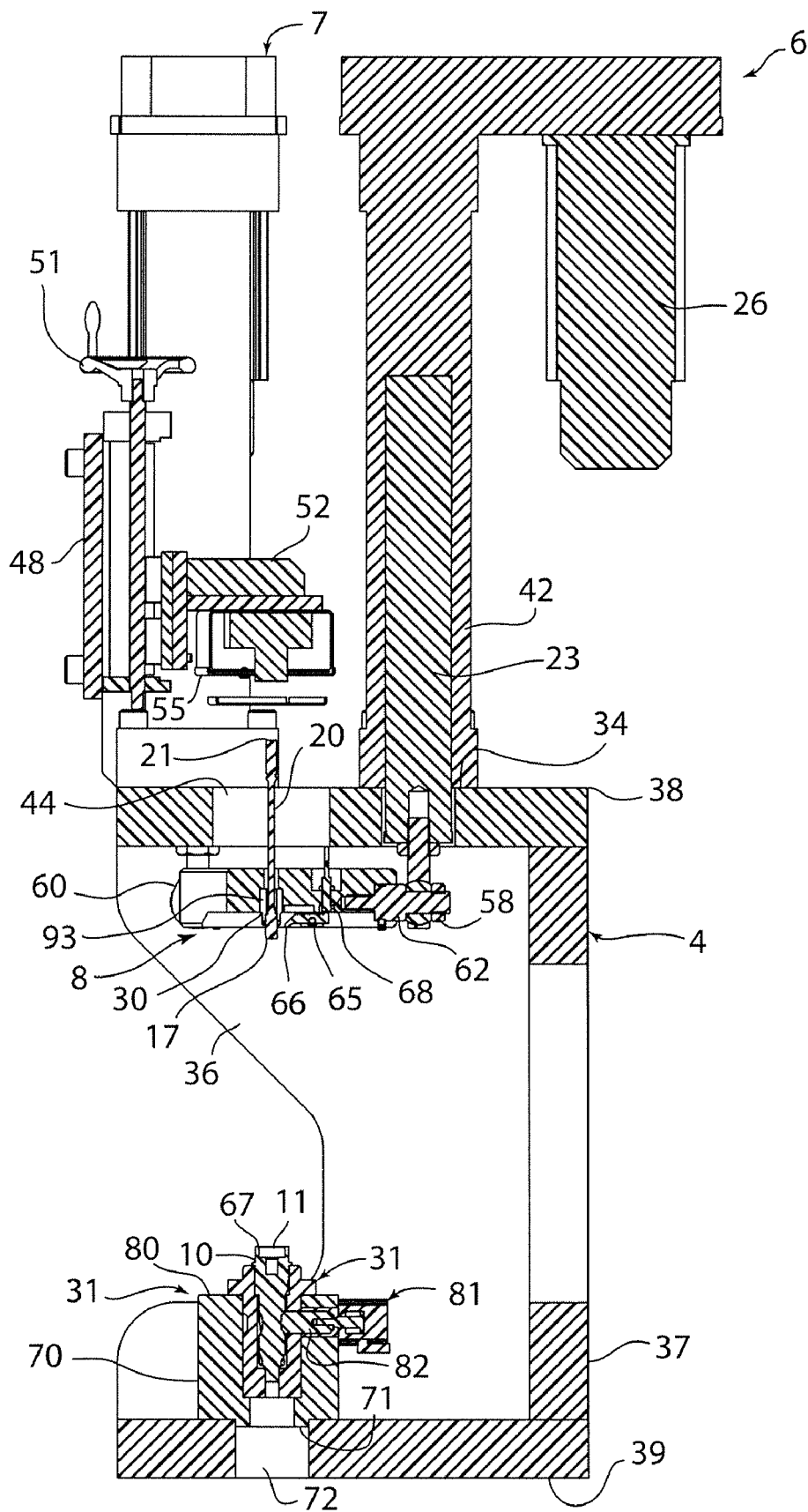
FIG. 9 is a cross-sectional view of the machine of FIG. 8 taken along the line IX-IX.
Figure 9A:
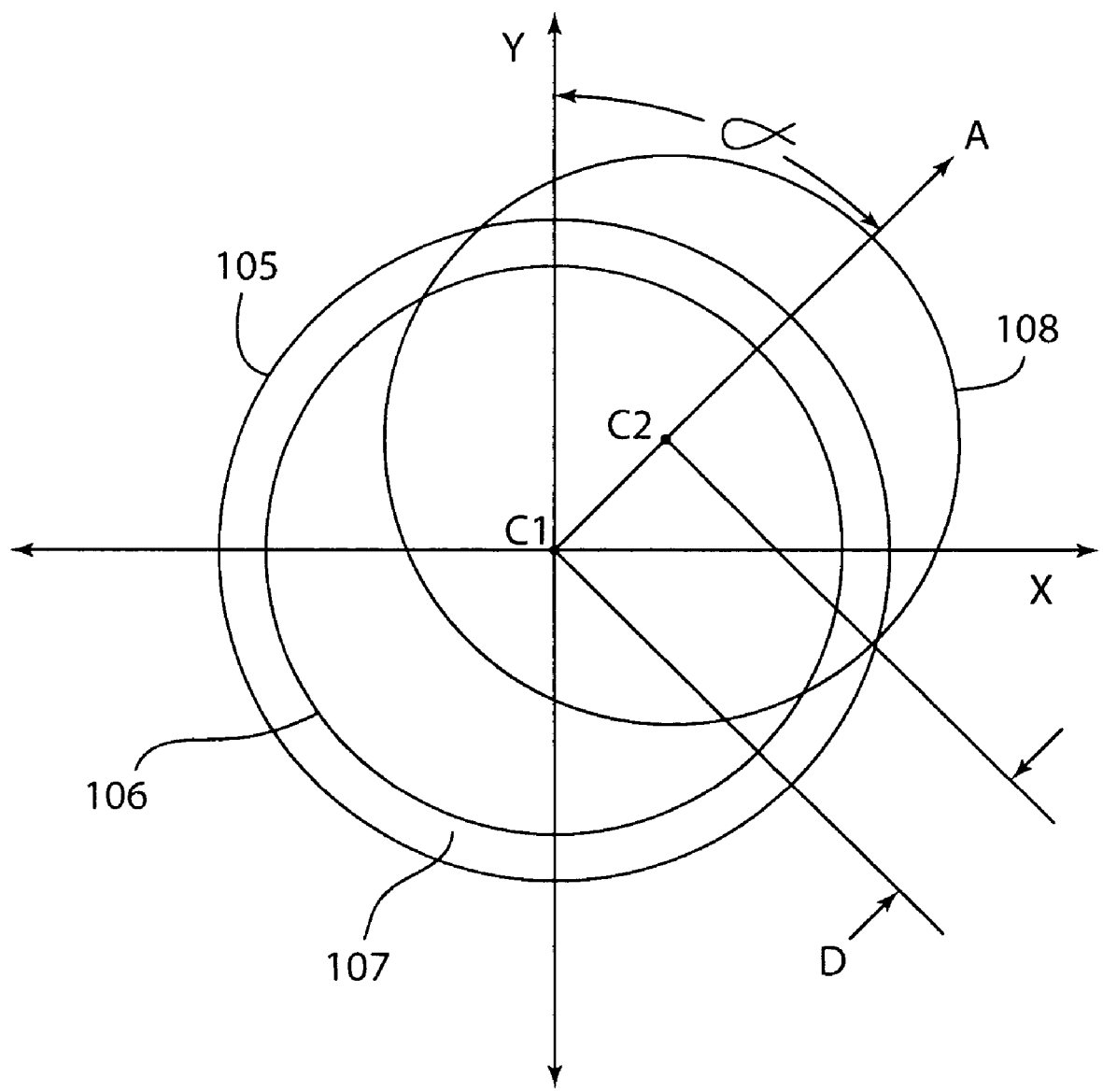
FIG. 9A is a schematic view of camera image data.
Figure 10:
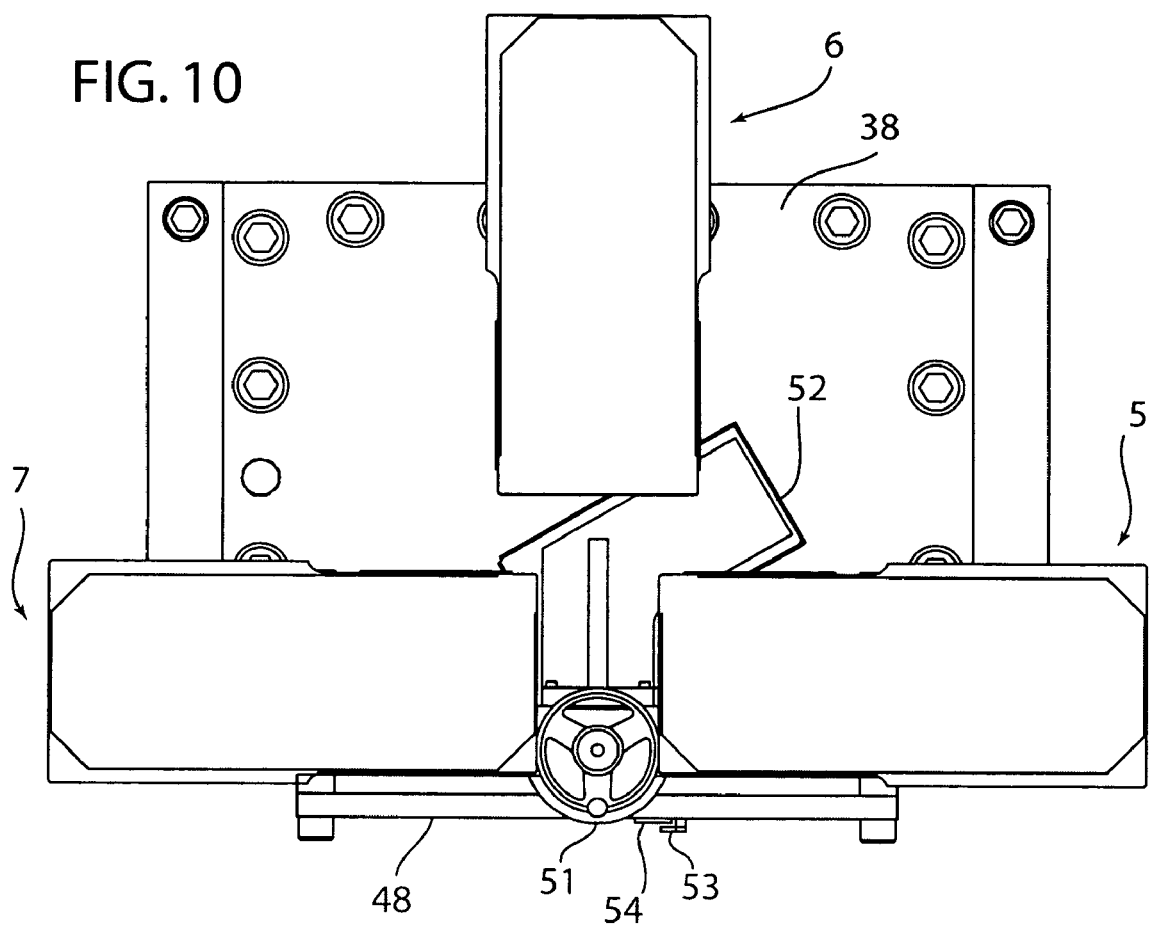
FIG. 10 is a top plan view of the machine of FIG. 6.

At the start of the press fit operation, head 8 is in the fully raised position illustrated in FIG. 9 to provide clearance for insertion of torsion bar 20 in holder 30. Controller 28 is programmed to actuate electric actuators 5-7 at a relatively high rate (e.g., 150 mm/sec) at the start of the press fit operation to quickly bring end 17 of torsion bar 20 into close proximity to gear 10. As the plate 60 is brought downwardly and the first end 17 of torsion bar 20 comes into close proximity (e.g., 15 mm) with the cavity 11 of gear 10, controller 28 slows the rate of travel of head 8 to a slower speed (e.g., 5.0 mm/sec). After the end of torsion bar 20 contacts the sidewalls of cavity 12 of gear 10, controller 28 continues to actuate servos 5-7 at a slow rate such that head 8 travels at about 5.0 mm/sec. An arm 65 is pivotably mounted to the plate 60 to provide for sensing of the position of lower end 17 of torsion bar 20 relative to pinion gear 10. When the head 8 has press fit torsion bar 20 to within 0.15 mm of the full press depth, the end 66 of arm 65 contacts upper surface 67 of gear 10 causing the arm 65 to rotate, causing precision switch 68 to generate a signal to the controller 28. Controller 28 then stops translation of head 8, retracts slightly, and then determines if a tilt correction is required. If the alignment of the torsion bar 20 is within tolerance (i.e., image 106, FIG. 9A, falls within tolerance circle 105), controller 28 raises head 8 and the torsion bar 20/gear 10 assembly is removed from machine 1 without further press fit of torsion bar 20 into cavity 11. Because the tolerance for the depth of the press fit is greater than 0.15 mm, the torsion bar 20 does not need to be further press fit if the alignment is within tolerance. Alternately, if controller 28 determines that the torsion bar 20 is not aligned within tolerance (i.e., a portion of image 106, FIG. 9A, falls on or outside tolerance circle 105), controller 28 executes a correction move by tilting head 8 opposite the direction of displacement represented by arrow "A" (FIG. 9A). Controller 28 then translates head 8 downwardly at a slow speed (e.g., 5.0 mm/sec) an additional 0.15 mm.

Figure 11:
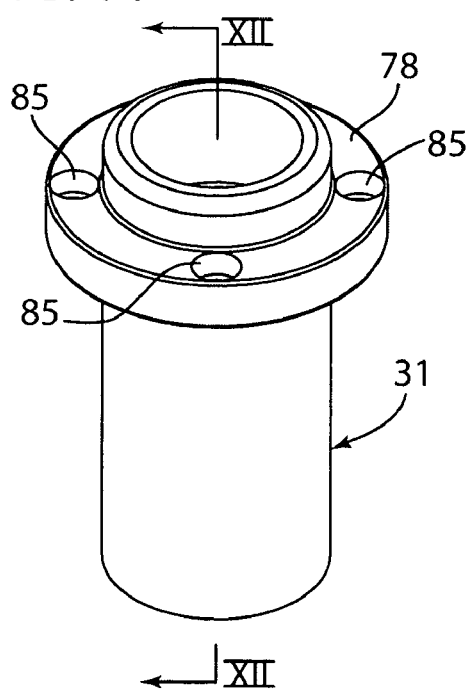
FIG. 11 is a perspective view of a holder for a pinion gear.
Figure 12:
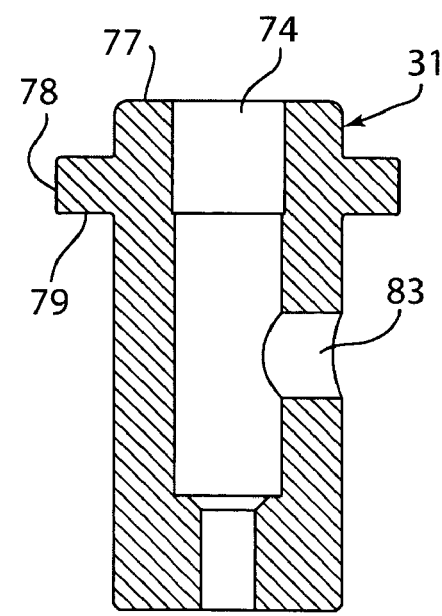
FIG. 12 is a cross-sectional view of the holder of FIG. 11 taken along the line XII-XII.

A mount 70 (FIG. 9) for supporting pinion gear holder 31 is positioned on the lower member 39. Mount 70 includes an extension 71 that is closely received within a circular bore 72 in member 39 to thereby position the mount 70. A plurality of threaded fasteners 73 (see also FIG. 7) secure the mount 70 to the lower member 39. With further reference to FIGS. 11 and 12, holder 31 includes a central bore 74 configured to receive pinion gear 10. Cylindrical outer surface portion 75 (FIG. 1) of pinion gear 10 is closely received in bore 74, and an annular edge 76 (FIG. 1) of gear 10 contacts upper surface 77 of holder 31 to react axial forces generated during the pressing operation. Holder 31 includes a collar 78 having a lower surface 79 that contacts upper surface 80 of holder 31 to thereby support the holder 31 in mount 70. With reference back to FIG. 9, a small pneumatic cylinder 81 is operably connected to controller 28 and includes a movable engagement or clamp member 82 that can be selectively shifted to engage a transverse bore 83 (FIG. 12) in holder 31 to thereby secure the gear 10 in holder 31. After the press fit operation, clamp member 82 is retracted to permit removal of the gear 10/torsion bar 20 assembly. A plurality of threaded fasteners 84 can be inserted through openings 85 in holder 31 to secure the holder 31 to mount 70.

Figure 13:
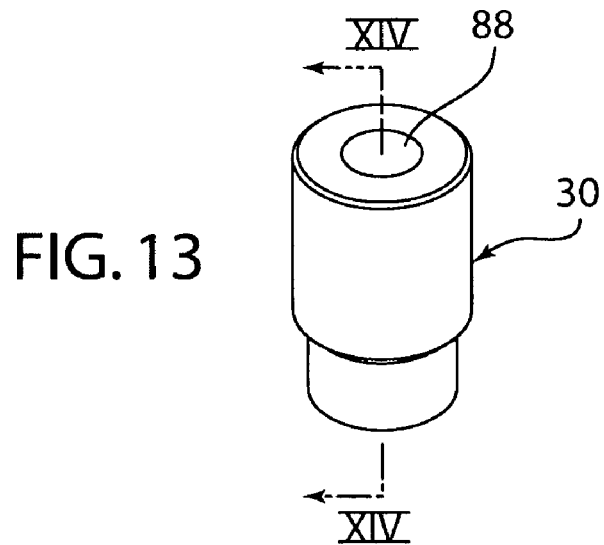
FIG. 13 is a perspective view of a holder for a torsion bar.
Figure 14:
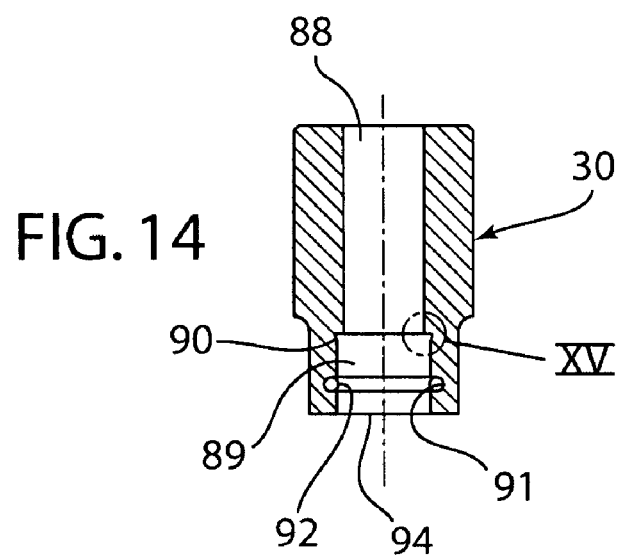
FIG. 14 is a cross-sectional view of the holder of FIG. 13 taken along the line XIV-XIV.
Figure 15:
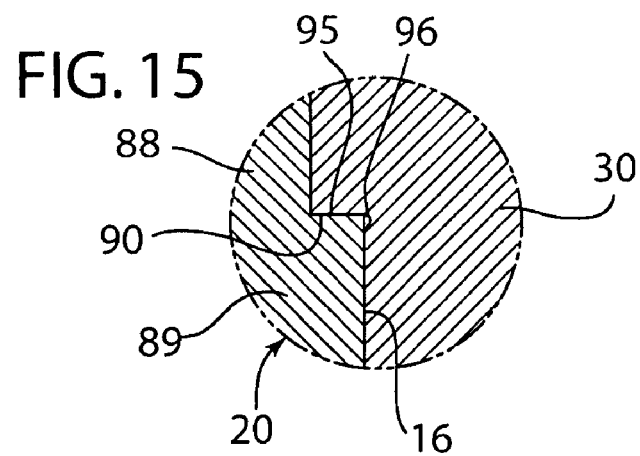
FIG. 15 is an enlarged view of the holder of FIG. 14.

With further reference to FIGS. 13-15, torsion bar holder 30 has a generally cylindrical shape, with a bore 88 extending therethrough. An enlarged lower portion 89 of bore 88 forms an annular step 90, and a resilient 0-ring 91 is received in an annular groove 92. When installed, holder 30 is received in a cylindrical bore 93 (FIG. 9) in plate 60, and a transverse set screw or the like (not shown) may be utilized to secure the holder 30 in position within plate 60. In use, a torsion bar 20 is inserted upwardly into lower end 94 of bore 88, until annular shoulder 95 of torsion bar adjacent outer surface 16 contacts annular step 90 in holder 30. Resilient O-ring 91 removably retains the torsion bar 20 in holder 30, and annular cut-back portion or groove 96 in holder at step 90 ensures that shoulder 95 of torsion bar 20 makes solid contact with step 90 of holder 30. Groove 96 also provides a radius at the corner to reduce stress concentration that would otherwise occur.

Controller 28 is programmed to provide a correction move according to several formulas. The following formula is utilized to calculate the pitch angle and direction (defined by angle α, FIG. 9A) of upper tooling head 8:

| | |
|---|---|
| Modified displacement = (Displacement + Adder) * Multiplier | 1.0 |
| Serve0 = Modified Displacement * Chart 0 | 1.1 |
| Serve1 = Modified Displacement * Chart 1 | 1.2 |
| Serve2 = Modified Displacement * Chart 2 | 1.3 |

Figure 16:
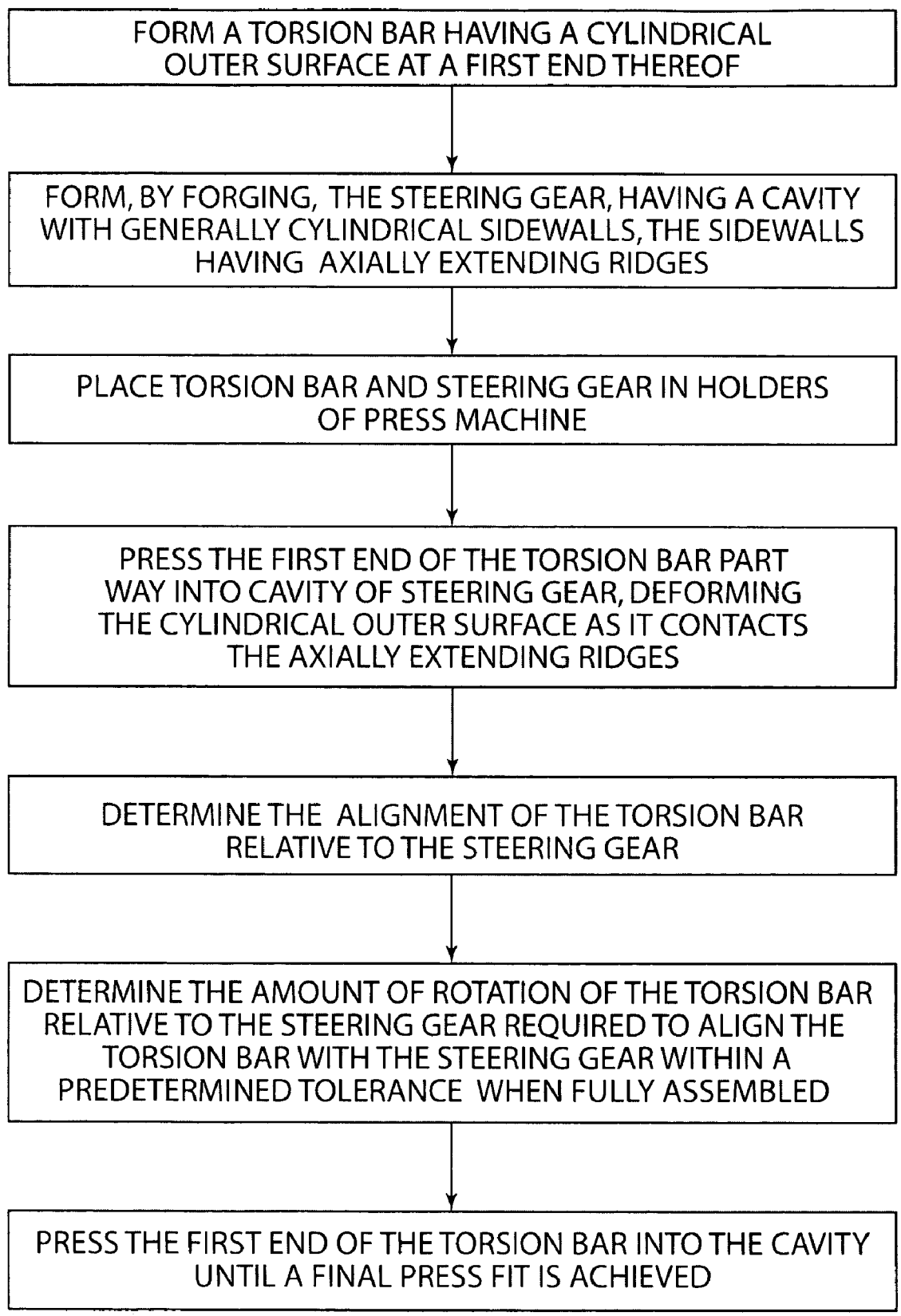
FIG. 16 is a flowchart illustrating the process of assembly power steering valve components according to one aspect of the present invention.

FIG. 16A illustrates the Chart 0, Chart 1, and Chart 2 values utilized in the formulas for calculation of the input variables Serve0, Serve1, and Serve2. Serve0 is a numerical value corresponding to the amount of travel of rear servo 6, Serve1 is the amount of travel of the right servo 5, and Serve2 is the amount of travel of left servo 7. Modified Displacements for the servos 5-7, respectively. The Displacement variable in equation 1.0 is the distance (run out) "D" (FIG. 9A) that the end of the torsion bar 20 is displaced from center C1 measured/calculated by camera 55/controller 28. The Adder variable in equation 1.0 is a value that is added to the displacement D to compensate for lash in the tooling and flex in the torsion bar 20 and gear 10. The rotation angles of FIG. 16A is the angle α (FIG. 9A) defining the direction of misalignment of the end of the torsion bar 20 as measured by camera 55.

FIGS. 17-24 illustrate various screens that can be displayed on screen 33 during operation of machine 1. A main screen (FIG. 17) includes a plurality of touch screen inputs 33A, 33B that can be utilized to select auto or manual mode operation. Touch screen inputs 33C-33K can be utilized to select additional screens.

Figure 23:
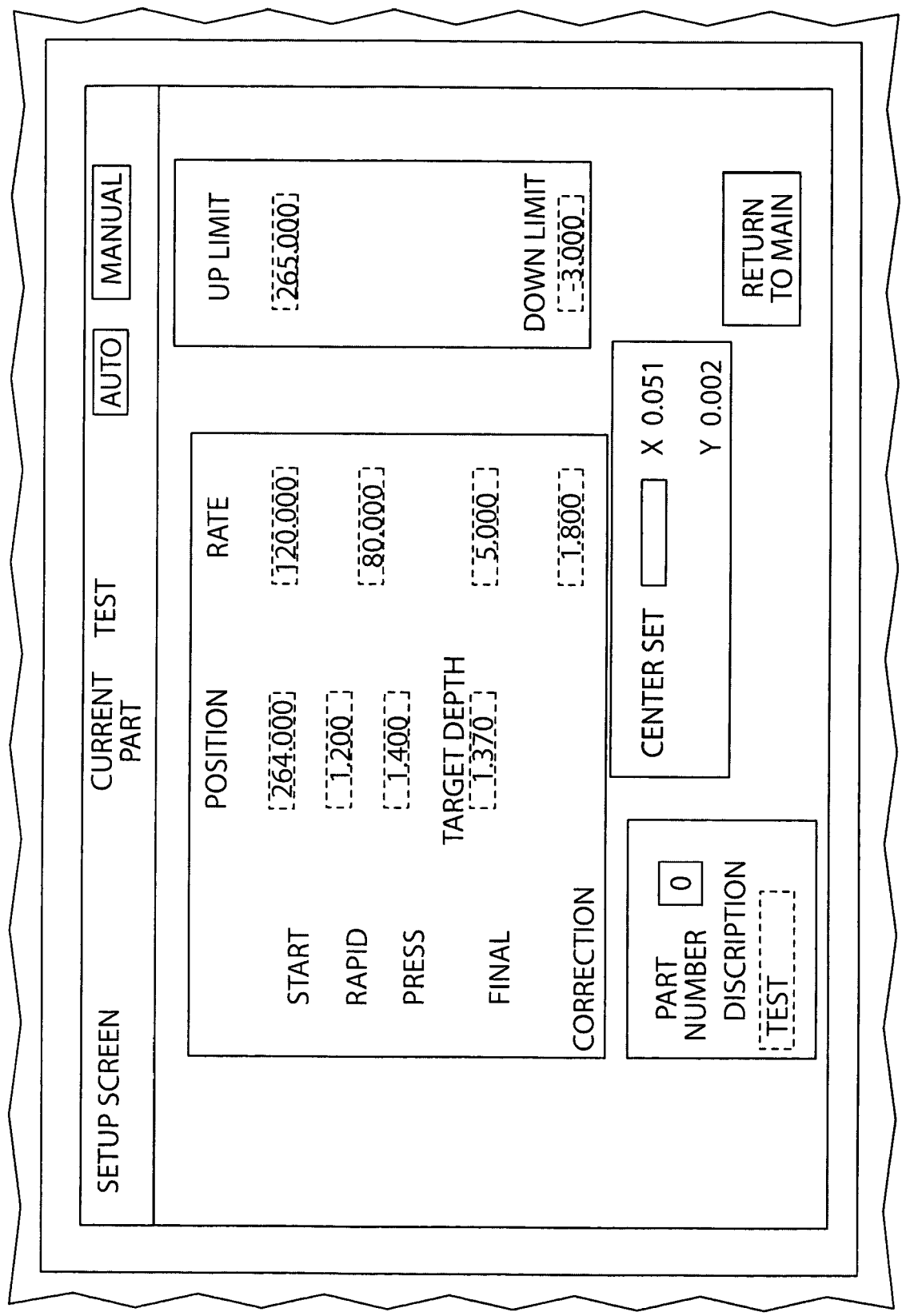
FIG. 23 shows the setup screen.

Setup Screen (FIG. 23)

Figure 17:
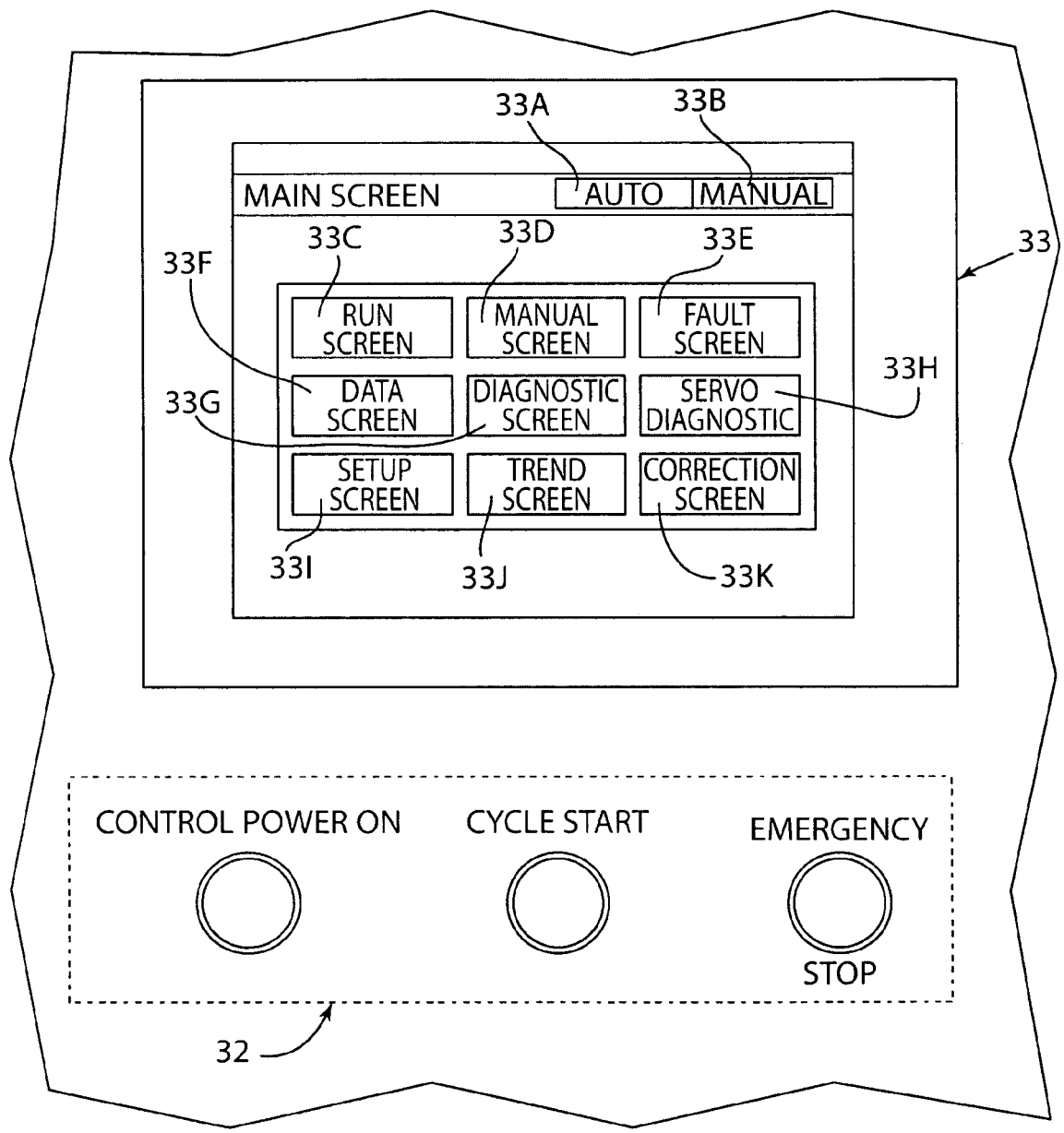
FIG. 17 is a view of the operator panel and main screen.

During set up of machine 1, Setup Screen (FIG. 23) can be selected from the Main Screen (FIG. 17). The following is a glossary of terms appearing on the Setup Screen:

CENTER SET: Resets the camera center position to a master part during part setup.

CORRECTION SPEED: If the torsion bar 20 is out of tolerance after the initial press, the machine 1 performs a correction move to bring the part (gear 10/torsion bar 20) into tolerance. The rate of the correction can be modified to manipulate the reaction of the torsion bar 20 during the correction move.

DESCRIPTION: Defines the name of the part. This value can be changed to correspond with the machine part number. The name will be displayed at the top of the Setup Screen next to the label "CURRENT PART".

DOWN LIMIT: Numeric limit set to limit and prevent over-travel of the servos 5-7. This value is the distance above the 0.00 position of the servos 5-7, used to set the home start position of the servos 5-7.

DEPTH READ-OUT ADJUSTMENT (TARGET DEPTH): This is a variable that can be changed to tune in the depth that is displayed on the Data Screen (FIG. 20). This does not affect the physical depth of the part. It only changes the value displayed on the Data Screen. This variable accommodates varying amounts of tolerance and repeatability of replacement details.

PART NUMBER: Number, 1 through 10, that is used to change from one part to another. Part number "0" has been established for testing, but could be used for a production part.

POSITION (title): This is a column title on the Setup Screen that lists the position at which different moves of the servos 5-7 take place.

PRESS DEPTH: This is the distance from the registration switch that the servos 5-7 will travel during the press operation. This value affects the physical depth of the part and should be tuned in coordination with the registration switch.

PRESS SPEED: This is the rate (in millimeters per second) at which the head 8 travels as it presses the torsion bar 20 into gear 10 during a normal cycle in automatic mode.

REG. SWITCH: This value is the distance above the 0.00 position of the servos 5-7, set to detect if the pinion 10 is loaded properly. If the pinion 10 is not loaded, the machine 1 will give the operator a registration switch fault. If the value of this setting is set too high, the torsion bar 20 will not be pressed to the proper depth, and the machine 1 will give the operator a registration switch fault.

RATE (title): This is a column title on the setup screen that lists the rate at which servos 5-7 move during the corresponding positions. These speeds are listed in millimeters per second.

RAPID UP: This is the rate at which the tooling travels when the head returns to the home position during a normal cycle in automatic mode. The rate is listed in millimeters per second.

RAPID DOWN: This is the rate at which the tooling travels when the head moves from the home position to the press position during a normal cycle in automatic mode. The rate is listed in millimeters per second.

START (HOME): This value is the distance above the 0.00 position of the servos 5-7, used to set the home start position of the servos 5-7. In the illustrated example, this value should be 264.000.

UP LIMIT: Numeric limit set to limit and prevent over-travel of the servos 5-7. This value is the distance below the 0.00 position of the servos 5-7, used to set the lower limit of the servos 5-7.

TARGET PRESSURE: This is the pressure that the machine 1 will theoretically stop at during a correction move.

PITCH: The angle from the horizontal base plate 39 that the upper tooling plate 60 is at during or before a correction move.

ANGLE: The angle α (FIG. 9A) of displacement of the end of torsion bar 20 from the zero position (axis Y) clockwise up to 360 degrees.

DISPLACEMENT: The run out D (FIG. 9A) of the torsion bar 20.

During machine set-up, the Correction Screen (FIG. 24) can be selected. The following is a glossary of the terms appearing on the Correction Screen:

Correction Screen

LEFT SERVO START: This value sets the home tilt angle and direction of the tooling head 8 for the initial press. These values can be changed to fine tune the initial press to produce the best part possible on the first press. This value is a distance from the 264.00 home or starting position of head 8 in millimeters. A negative number is a distance higher than 264.00 mm (up). Changing this value affects various variables, including the depth and initial displacement of the torsion bar 20. If this value is changed, the head 8 of machine 1 must be brought to the home position before it will take affect.

RIGHT SERVO START: This value sets the home tilt and angle (α) of the tooling head 8 for the initial press. These values can be changes to fine tune the initial press to produce the best part possible on the initial press. This value is a distance from the 264.00 home position in millimeters. A negative number is a distance higher than 264.00 mm (up). Changing this value affects many various variables, including the depth and initial displacement of the torsion bar 20. If this value is changed, the head machine 1 must be brought to the home position before it will take affect.

REAR SERVO START: This value sets the home pitch angle and direction (i.e., angle α, FIG. 9A) of the tooling head 8 for the initial press. These values can be changes to fine tune the initial press to produce the best part possible on the initial press. This value is a distance from the 264.00 home position in millimeters. A negative number is a distance higher than 264.00 mm (up). Changing this value affects several variables, including the depth and initial displacement of the torsion bar 20. If this value is changed, the head of machine 1 must be brought to the home position before it will take affect.

MULTIPLIER: This is the value in equation 1.0 that is applied to the displacement (run out) of the torsion bar 20 and the "ADDER", and used in equation 1.0 to calculate the proper pitch angle and direction of the upper tooling head 8 during a correction move.

PRESS FORCE MEAN: This value is set to an expected press force used to press the parts together on the initial press. This value affects the correction move and the DEPTH value listed on the Data Screen (FIG. 20).

PRESS IN FORCE MULTIPLIER: Used to modify the press force value that is used in the correction formulas. This does not affect the actual press force.

PRESSURE MOVE 1: This value is used to limit the travel of the servos 5-7 during the correction move. This value is the maximum allowed force (measured by the load cells of servos 5-7) during the final press after a correction move. If this value is exceeded, controller 28 stops servos 5-7 to prevent overloading of the machine 1.

PRESSURE MOVE 2: Though rarely used, this value is used to limit the travel of the servos 5-7 during the correction move. This value is the distance that the servos 5-7 can travel beyond the initial press position during a correction move. If the load cells (not shown) do not reach the target value calculated by the correction formulas, the servos 5-7 stop at these calculated values. This is used only if the number of retries is greater than 1.

ADDER: This is the value in equation 1.0 that is added to the Displacement (run out) of the torsion bar 20 and used in a formula to calculate the proper pitch angle of the upper tooling head 8 during a correction move. This numeric value is set to accommodate for tooling lash.

CAMERA VIEW POS.: This value is the distance above the 0.00 position of the servos 5-7 at which the part is analyzed by the controller 28 to determine part displacement (run out).

CORRECTION FACTOR: This is a column title on the correction screen (FIG. 24) that lists the different variables used to correct the alignment of the torsion bar 20 relative gear 10.

DEPTH MULTIPLIER: As discussed in more detail below, this is a factor that can be changed to tune the depth that is displayed on the Data Screen (FIG. 20). This does not affect the physical depth of the part. It only changes the value displayed on the data screen. This has been established to accommodate for varying amounts of tooling lash caused by variations in press force.

DISPLACEMENT: This title applies to the displacements (0.25 mm and 0.50 mm) at which forces DISP. #1 and DISP. #2 are applied. (The "DISPLACEMENT" values on the Correction Screen are not the Displacement variable of equation 1.0) define correction variables.

DISP. #1: This value is the force used to correct the torsion bar 20 at a displacement value of 0.25 mm.

DISP. #2: This value is the force used to correct the torsion bar 20 at a displacement value of 0.50 mm.

FINAL PART TOLERANCE: This value is used to change the point (i.e., diameter of tolerance circle 105, FIG. 9A) at which the part will pass or fail on the final press, and also determines if the alignment of the part needs correction after the initial press.

INITIAL PART TOLERANCE: Use this value is used to change the point at which the part will pass or fail on the initial press.

RETRY #: Defines the number of times that the machine will try to correct the torsion bar 20. In general, if a part cannot be fixed in the first attempt, it likely cannot be fixed on the second attempt. This feature may be used for future parts or conditions.

TARGET DEPTH: As described in more detail below, this is a factor that can be changed to tune in the depth that is displayed on the data screen (FIG. 20). This does not affect the physical depth of the part. It only changes the value displayed on the data screen. This factor accommodates varying amounts of tooling lash caused by a wide variation in press force.

Initial Press Fine Tuning

During operation, the initial press may need to be tuned to run as true as possible. By changing the start positions of servos 5-7, the initial press can be utilized for fine tuning.

Step 1. To start, a dial indicator is used to check the parallelism of the upper tooling plate 60 to the bottom plate 39 of the machine 1. The start positions of servos 5-7 are adjusted and the machine 1 is adjusted or "homed" until the upper tooling plate 60 is parallel to lower plate 39.

Step 2. Several parts (i.e., gear 10/torsion bar 20) are then run with the final press tolerance set to a large value such as 1.0 mm or more. A large setting ensures that the machine 1 does not perform a correction move.

Step 3. The depth of the torsion bar 20 is checked after the initial press to confirm that the press depth is approximately 0.08 mm below the part depth (1.39 mm). If the depth is not near this number, and the press force was near the press force mean, the PRESS value is adjusted on the Setup Screen accordingly.

An initial batch of parts is then run to develop a pattern of the angle and displacement of the torsion bars 20. The average angle and average displacement from the initial batch of parts is then calculated. Using the upper tooling correction chart, the average displacement is multiplied by the proper value from the chart. This determines the proper amount to add or subtract to each servo 5-7. Also, an experienced operator having an understanding of the machine can make estimates concerning which servos 5-7 to move and how much.

The depth of the part may change after this adjustment has been made. If this occurs, step 3 is repeated as required to tune the proper depth of the torsion bar 20 as follows:

The TARGET DEPTH is changed to modify the depth that is displayed on the Data Screen. If the TARGET DEPTH is increased, the depth that is displayed on the Data Screen will increase.

Figure 18:
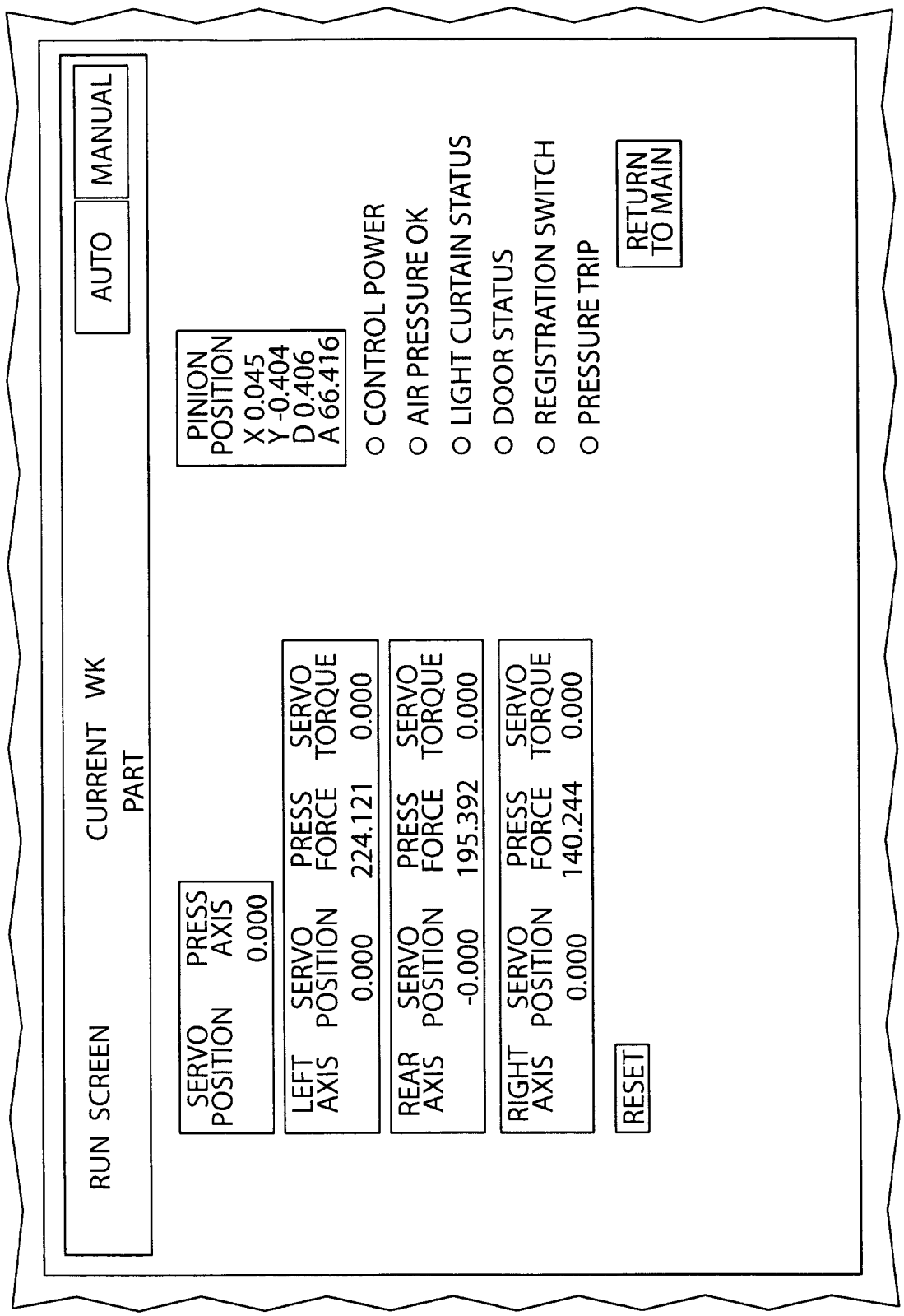
FIG. 18 shows the run screen.
Figure 19:
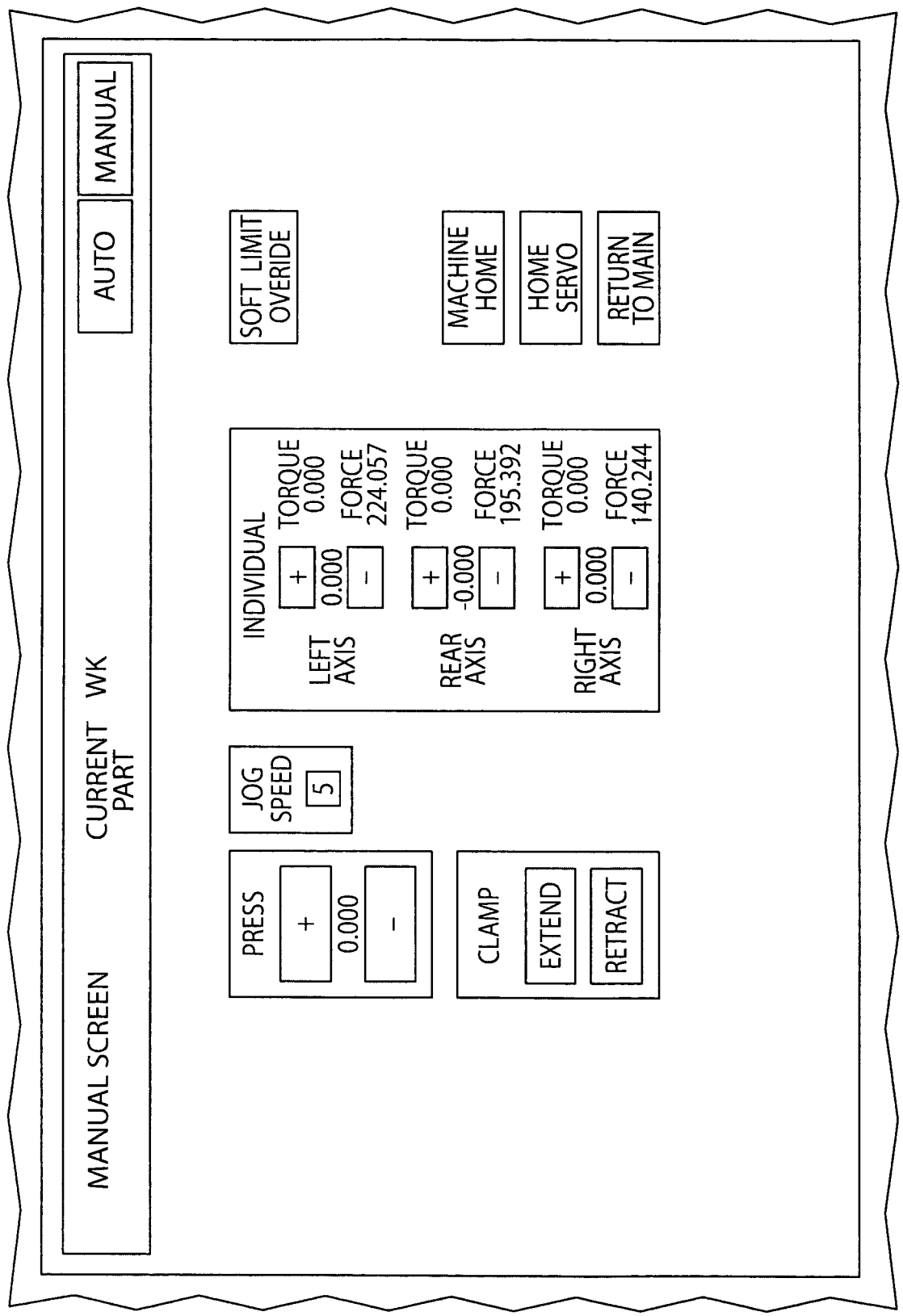
FIG. 19 shows the manual operation screen.
Figure 21:
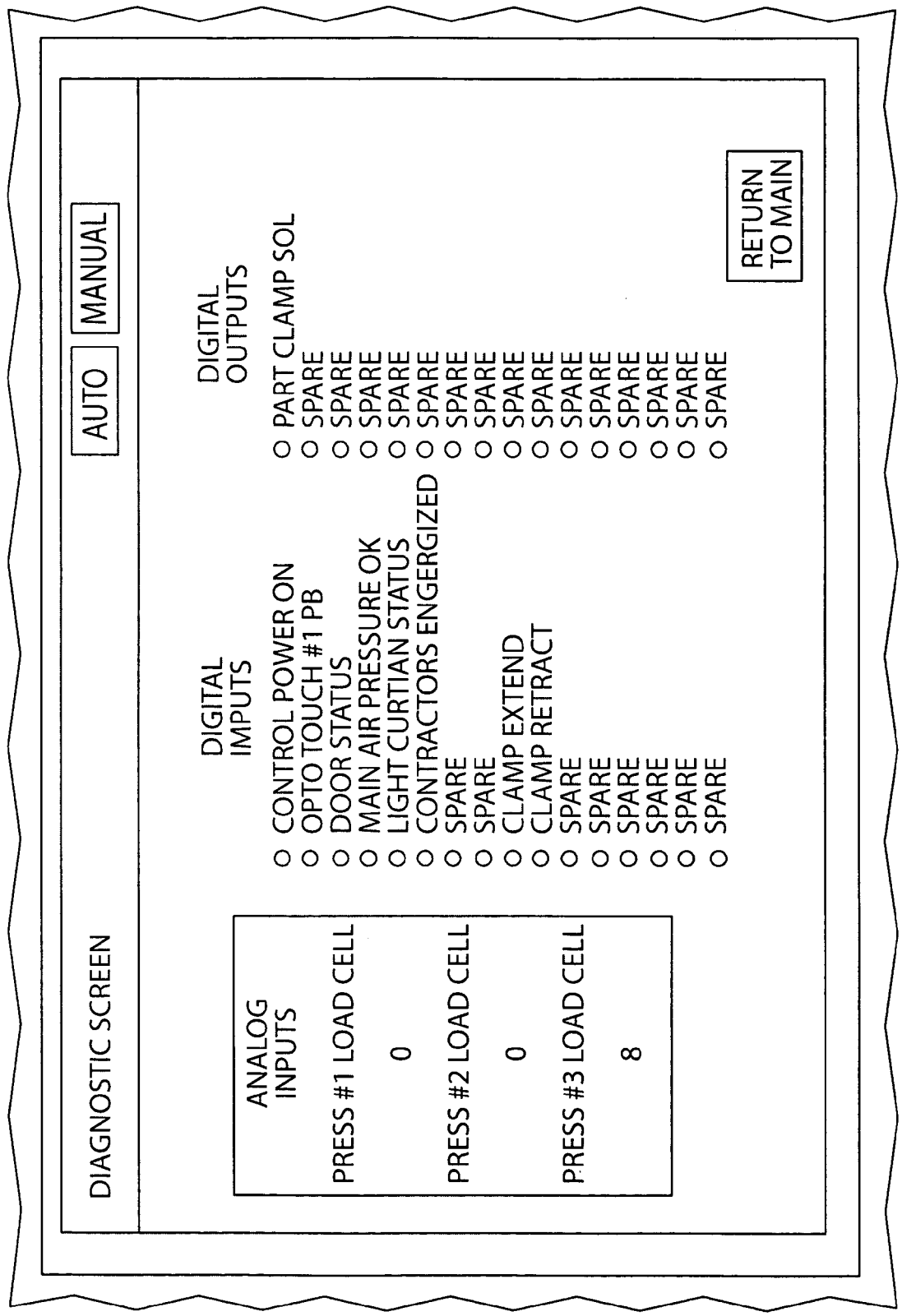
FIG. 21 shows the diagnostic screen.
Figure 22:
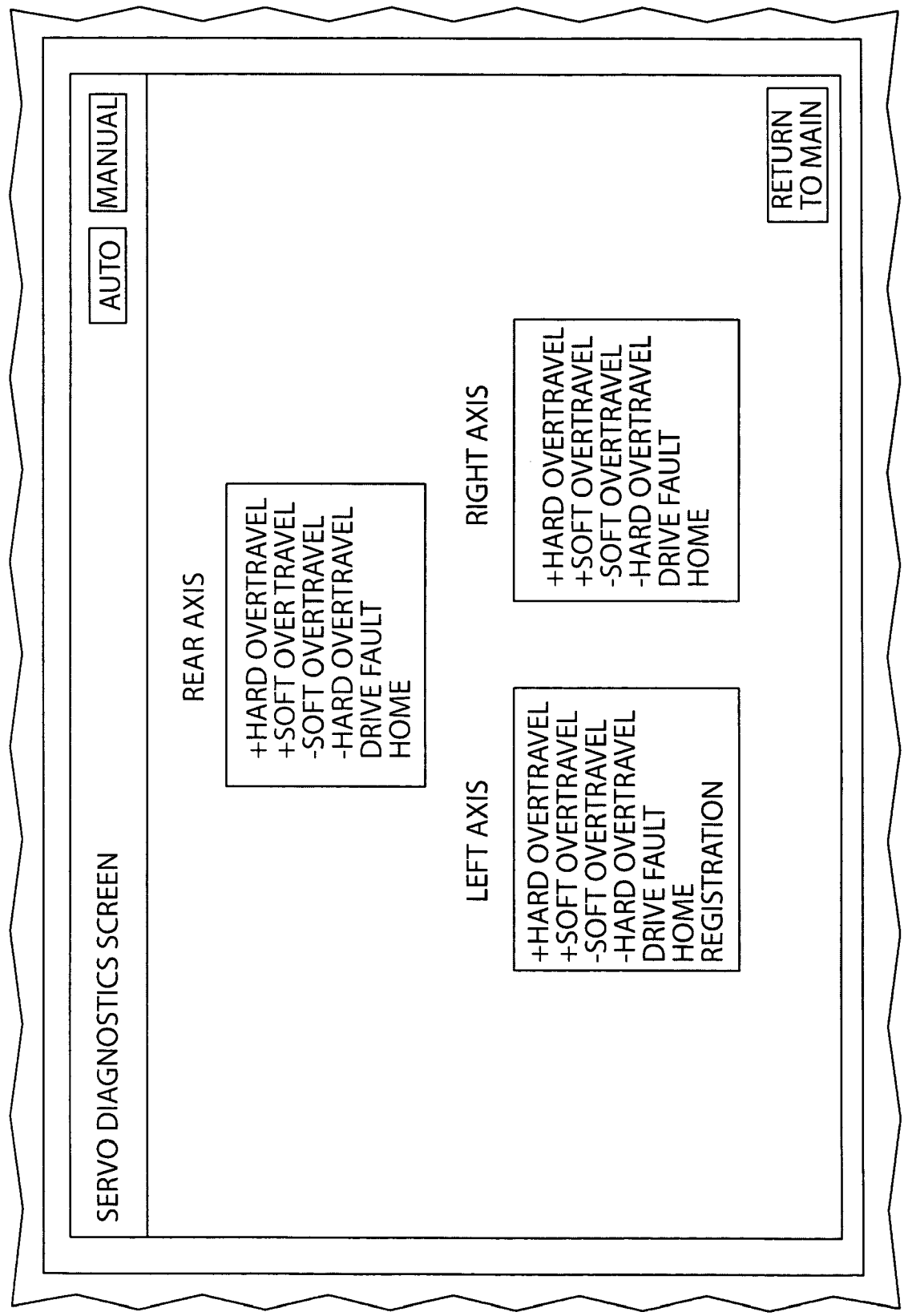
FIG. 22 shows the servo diagnostics screen.

The DEPTH MULTIPLIER is then changed to adjust the depth that is displayed on the Data Screen. This value is directly related to the measured PRESS FORCE, the value of which is displayed on the Run Screen (FIG. 18). If the PRESS FORCE is higher than the PRESS FORCE MEAN, then the depths will tend to be a few microns shallower that the desired depth. If the PRESS FORCE is lower than the PRESS FORCE MEAN, then the depths tend to be a few microns deeper that the desired depth. The DEPTH MULTIPLIER should be tuned until the depth on the Data Screen matches the actual depth of the torsion bar 20 within 0.05 mm.

Upper Tooling Correction Move

Initial correction of the torsion bar 20 may require adjustment of the values of several correction variables. Most of these values can be adjusted from the Correction Screen, with the exception of the rate at which the correction takes place. The rate can be modified on the Setup Screen (FIG. 23). The following is a list of values that may be changed to correct the Displacement (run out) of the torsion bar 20.

First, the PRESS FORCE mean is set to the average pressure required to press the torsion bar 20 to the proper depth.

The DISPLACEMENT values (DISP. #1 and DISP. #2) are then set for the correction at 0.25 mm and 0.50 mm. These values are usually near the PRESS FORCE MEAN.

The PRESS IN FORCE MULTIPLIER can be used to adjust the target pressure for the correction move. Generally, the value of the PRESS IN FORCE MULTIPLIER can remain at 1.00.

The CORRECTION FACTOR, ADDER and MULTIPLIER are set to adjust the tilt angle and the upper tooling head 8 during the correction move.

The pressure move is set to "1" to limit the travel of the servos 5-7 during the correction move. This value should be set to ensure that the depth of the torsion bar 20 is within tolerance after the correction is complete.

The retry # is set to "1".

The correction rate is set to 1.8 mm for the first correction. More speed tends to correct more, and less speed will tend to under correct. Varying the correction rate can be utilized for fine tuning the correction of the torsion bar 20.

The apparatus 1 of the present invention provides a precise press fit between a torsion bar and gear or other components requiring a press fit having an accurate axial alignment between the parts. Because the parts are aligned during the press fit operation, additional operations to correct the alignment between the parts are not required.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A machine for press fit assembly of first and second members whereby a male portion of the second member is disposed in an aperture in the first member when in a fully assembled configuration, the machine comprising:
   a controller;
   a support structure;
   a first holder configured to support a first member;
   a second holder configured to support a second member, wherein the second holder is operably interconnected to the first holder for powered translation and rotation of the first and second holders relative to one another;
   a sensor adapted to determine a position of a second member in the second holder relative to a first member in the first holder;
   and wherein:
   the controller causes at least one of the first and second holders to translate such that a male portion of a second member is at least partially disposed in an aperture of a first member, and wherein the controller causes powered tilting of at least a selected one of the first and second holders relative to the other of the first and second holders when a male portion of a second member is at least partially disposed in an aperture of a first member based, at least in part, upon input from the sensor concerning a position of a first member relative to a second member and providing proper alignment of the first and second members when press fit together.

2. The machine of claim 1, wherein:
the sensor comprises a camera that is coupled to the controller.

3. The machine of claim 2, including:
at least one electrically powered linear actuator.

4. The machine of claim 1, including:
an adjustment mechanism providing adjustment of the vertical position of the sensor relative to the second holder.

5. The machine of claim 1, wherein:
the controller accesses stored information concerning the amount of tilt of the first holder relative to the second holder required to compensate for misalignment measured by the sensor.

6. The machine of claim 1, wherein:
at least one of the first and second holders includes a resilient O-ring.

7. A machine for press fit assembly of first and second members with a male portion of the second member extending into an aperture in the first member, the machine comprising:
   a controller;
   a support structure;
   a first holder configured to support a first member;
   a second holder configured to support a second member;
   a sensor adapted to determine a position of a second member in the second holder relative to a first member in the first holder;
   at least one powered actuator connected to the support structure and operably coupled to a selected one of the first and second holders, the powered actuator providing translational and rotational motion of the selected one of the first and second holders and press fit a first member and second member together;
   the controller actuates the powered actuator and tilts the selected one of the first and second holders relative to the other of the first and second holders based, at least in part, upon input from the sensor concerning a position of a first member relative to a second member and providing proper alignment of the first and second members when press fit together; and wherein:
   the at least one powered actuator comprises at least three electrically powered linear actuators, each having an extensible output member pivotably connected to the second holder, the controller controlling movement of the output members and controlling tilting of the second holder relative to the first holder.

8. The machine of claim 7, wherein:
the controller initially actuates all three linear actuators such that the output members all initially travel substantially the same distance to partially press a second member into an aperture in a first member, followed by compensatory tilting of the second holder based, at least in part, upon positional information from the sensor, followed by actuation of all three linear actuators to complete press fit of first and second members together.

9. The machine of claim 8, wherein:
the linear actuators are parallel to one another, and include ball joints on the output members pivotably connected to the second holder.

10. The machine of claim 9, wherein:
the support structure includes vertically spaced-apart upper and lower plates, and a vertically extending structural member rigidly interconnecting the upper and lower plates;
the first holder is mounted on the lower plate;
the second holder is positioned below the upper plate directly above the first holder; and
the linear actuators are mounted to the upper plate with the output members extending below the upper plate.

11. A machine for press fit of an insert, comprising:
a support structure;
a first holder configured to support a first component defining a first axis and having a cavity;
a second holder configured to support a second component defining a second axis and having a male portion;
a sensor determining the position of the first axis relative to the second axis;
at least three electrically powered actuators mounted to the support structure, each actuator having a movable output member connected to the second holder and providing powered translation and tilting of the second holder relative to the first holder during press fit of the male portion into the cavity.

12. The machine of claim 11, including:
a controller coupled to the sensor and controlling the powered actuators based, at least in part, upon positional information by the sensor.

13. The machine of claim 11, wherein:
at least one of the first and second holders includes a resilient O-ring.

14. A machine for press fit of an insert, comprising:
a support structure;
a first holder configured to support a first component defining a first axis and having a cavity;
a second holder configured to support a second component defining a second axis and having a male portion;
a sensor determining the position of the first axis relative to the second axis;
at least three electrically powered actuators mounted to the support structure, each actuator having a movable output member connected to the second holder providing translation and tilting of the second holder relative to the first holder during press fit of the male portion into the cavity;
a controller coupled to the sensor and controlling the powered actuators based, at least in part, upon positional information by the sensor; and wherein:
the powered actuators comprise linear actuators, and the output members translate linearly.

15. The machine of claim 14, wherein:
the output members are pivotably connected to the second holder.

16. The machine of claim 15, wherein:
the sensor comprises a camera.

17. The machine of claim 15, wherein:
the controller initially actuates all three linear actuators such that all of the output members initially travel substantially the same distance to partially press a male portion of a second component into a cavity of a first component, followed by compensatory tilting of at least one of the first and second holders based, at least in part, upon positional information from the sensor concerning a relative position of a first component relative to a second component, followed by actuation of all three linear actuators.

18. The machine of claim 17, wherein:
the support structure includes vertically spaced-apart upper and lower plates, and a vertically extending structural member rigidly interconnecting the upper and lower plates;
the first holder is mounted on the lower plate;
the second holder is positioned below the upper plate substantially in vertical registry above the first holder; and
the linear actuators are mounted to the upper plate with the output members extending below the upper plate.

* * * * *